United States Patent [19]
Persson

[11] 3,860,330
[45] Jan. 14, 1975

[54] REFRACTOR WITH A SYNCHRONIZED CYLINDER LENS AXIS AND CROSS CYLINDER LENS AXIS

[75] Inventor: Staffan B. Persson, Kenmore, N.Y.

[73] Assignee: Bausch & Lomb Incorporated, Rochester, N.Y.

[22] Filed: Apr. 25, 1973

[21] Appl. No.: 354,429

[52] U.S. Cl. .................................. 351/29, 351/28
[51] Int. Cl. .............................................. A61b 3/02
[58] Field of Search ............................. 351/28, 29

[56] References Cited
UNITED STATES PATENTS
3,698,799   10/1972   Pitchford .............................. 351/28

Primary Examiner—Paul A. Sacher
Attorney, Agent, or Firm—Frank C. Parker; Harry C. Post, III

[57] ABSTRACT

This is a refractor having movement of the axis of the cross cylinder lens used for the Jackson cross cylinder technique, synchronized with movement of the axis of the presented cylinder lens.

4 Claims, 5 Drawing Figures

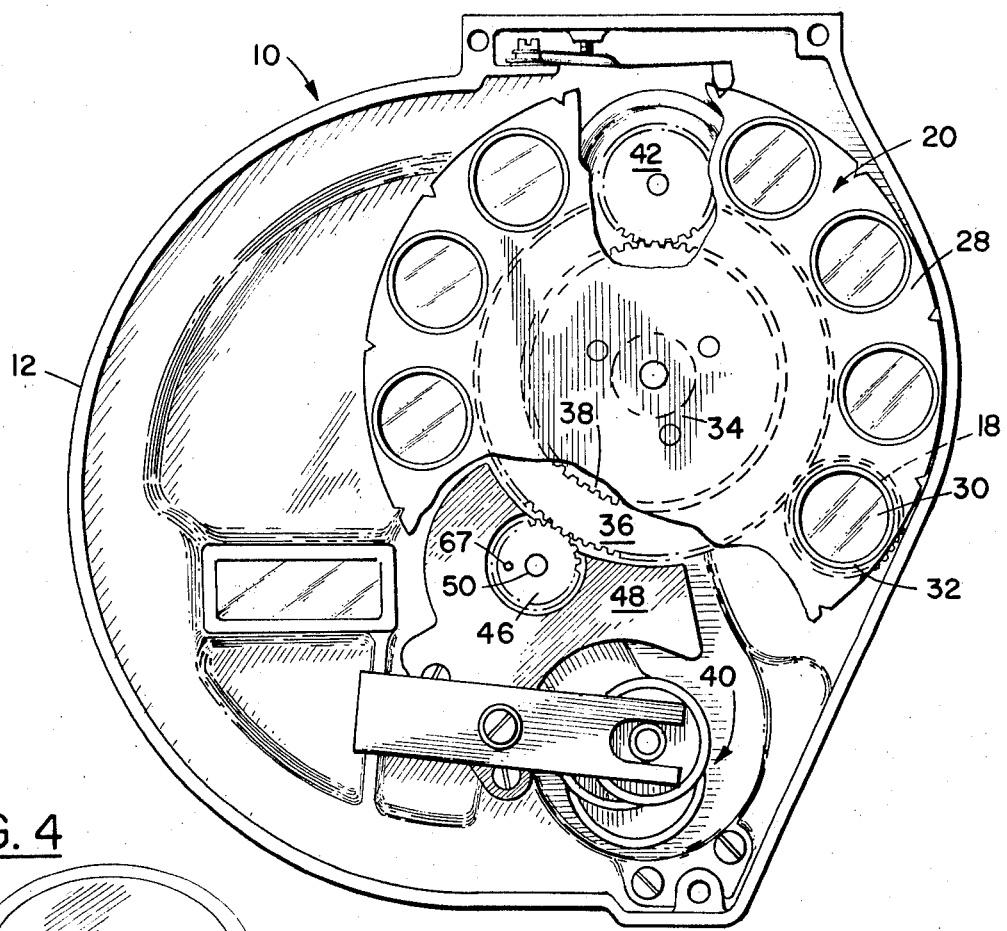
FIG. 1
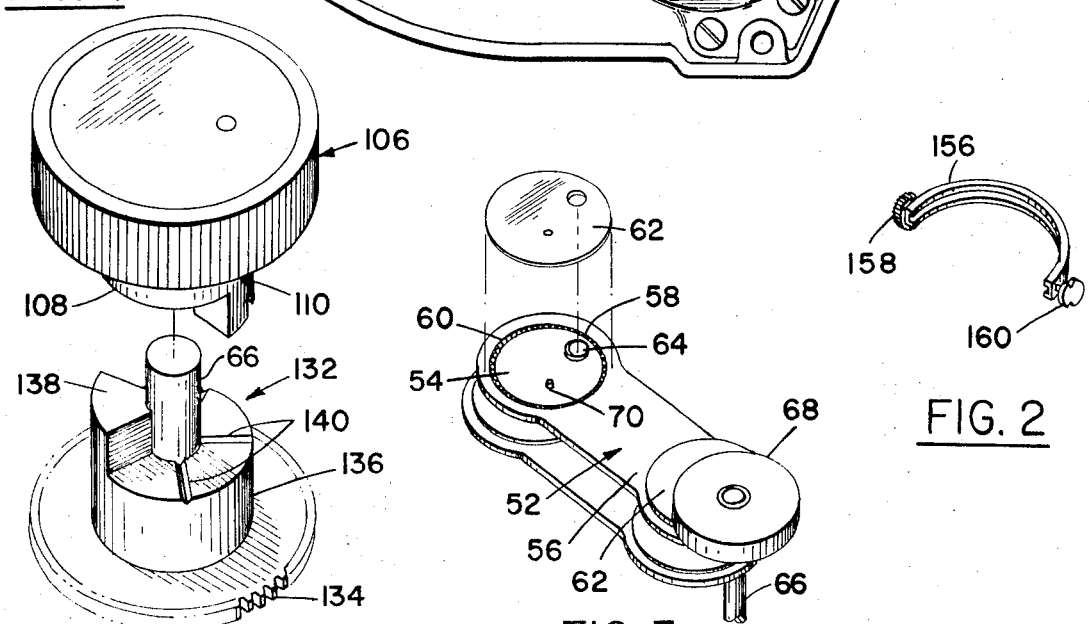
FIG. 4
FIG. 3
FIG. 2

REFRACTOR WITH A SYNCHRONIZED CYLINDER LENS AXIS AND CROSS CYLINDER LENS AXIS

BACKGROUND OF THE INVENTION

A refractor is a known ophthalmic instrument having batteries of lenses to which the principle of the Orthagon Vertex Test lenses is applied to determine and remedy the refractive errors of a patient's eyes. In modern refractors there is a left and a right battery, similar to each other and including discs containing lenses of spherical and cylindrical power, means for rotating the discs to place a lens or a combination of lenses before the eye under examination and means of setting the axis of the cylinder lens.

A modern refractor also includes cross cylinder lenses which are used to practice the Jackson Cross Cylinder technique as a check test for the setting of astigmatic axis and power and also for the determination of astigmatism. It is desirable that the cylinder axis be correctly aligned to the patient's axis of astigmatism, and, therefore means are incorporated into the refractor to insure that each lens in the cylinder disc is positioned in the viewing tube with its axis at the same angular orientation as its predecessor unless deliberately changed by the Examiner. The cross cylinder lens is mounted in a yoke so that it may be flipped 180° about a flip axis from a first position to a second. The cross cylinder lens is composed of equal power plus and minus cylinders with their principal axes 90° apart and the flip axis positioned 45° from the principal axes.

The flip axis of the cross cylinder lens is aligned with the axis of the cylinder lens by rotating the cross cylinder lens. The cross cylinder lens is flipped and the patient is asked whether there is a difference in acuity in the two positions, if there is, the axis of the cylinder lens is incorrect and the axis of the cylinder lens is changed, the cross cylinder lens flip axis is aligned with it and the flip test is again performed. This procedure is continued until the patient observes equal blurring in the two positions of the flipped cross cylinder lens.

The cross cylinder lens is then positioned so that its flip axis is 45° away from the previously determined astigmatism correcting cylinder axis. If the correcting cylinder is of the proper power, the addition of the cross cylinders will make type or test characters shown to the patient appear of the same degree of blur in either position of the cross cylinder lens. If one position of the flipped cross cylinder lens produces greater acuity than the other, the cylinder is either too weak or too strong and further correction must be made. Depending on whether the plus or minus cross-cylinder axis is aligned parallel with the correcting cylinder axis when the least blur occurs, the cylinder power is changed toward plus or minus and the flip test is repeated until the degree of blur is the same in both positions of the cross cylinder lens.

The Jackson cross cylinder technique as described herein is tedious, time consuming and open to errors of judgment, in reading scales for example.

The patent to Leonard A. Wilkinson U.S. Pat. No. 3,498,699 issued Mar. 3, 1970 discloses a refractor in which the axis of the cross cylinder lens is gear-interlocked to the axis of the cylinder lenses. The gear-interlock includes a two-branch gear train connecting the control knob to the presented cylinder lenses and to the cross cylinder loupe. In the present invention the interlock is accomplished by a combination gear and linkage arrangement. Early patents which disclose refractors are: U.S. Pat. Nos. 1,804,690; 1,804,691; 1,873,356; and 1,945,940.

SUMMARY OF THE INVENTION

In order to avoid the difficulties of prior art refractors which included means for practicing the Jackson cross cylinder technique the applicant has coupled rotation of the cylinder lens axis to rotation of a predetermined axis of the cross cylinder lens and also rotation of the axis of the accessory cylinder lens. This synchronization avoids many of the problems mentioned heretofore when using prior art devices. The mechanism for accomplishing the synchronization includes a combination gear linkage arrangement.

An object of the present invention is to provide an automatic means of synchronizing the alignment of the cross cylinder lens flip axis and the correcting cylinder lens axis.

Another object of the present invention is to provide automatic synchronization of the alignment of the cross cylinder lens flip axis and the correcting cylinder lens axis by coupling rotation of the correcting cylinder lenses to rotations of the cross cylinder lens through a gear linkage combination.

Still another object of the present invention is to provide a control knob for a refractor coupled to a gear linkage combination which synchronizes rotation of the correcting cylinder lens flip axis with rotation of the cross cylinder lens axis.

Another object of the present invention is to provide a knob for a refractor which flips the cross cylinder lens through activation of the gear train.

BRIEF DESCRIPTION OF THE DRAWINGS

FIG. 1 is a plan view, partly in section, of the cylinder lens assembly using an embodiment of the present invention;

FIG. 2 is a perspective view of a cross cylinder yoke;

FIG. 3 is an exploded perspective view of the improvement used in the embodiment of the invention shown in FIG. 1;

FIG. 4 is an exploded perspective view of an axis control knob used with the main cross cylinder axis gear.

DESCRIPTION OF THE PREFERRED EMBODIMENT

Figure 5:
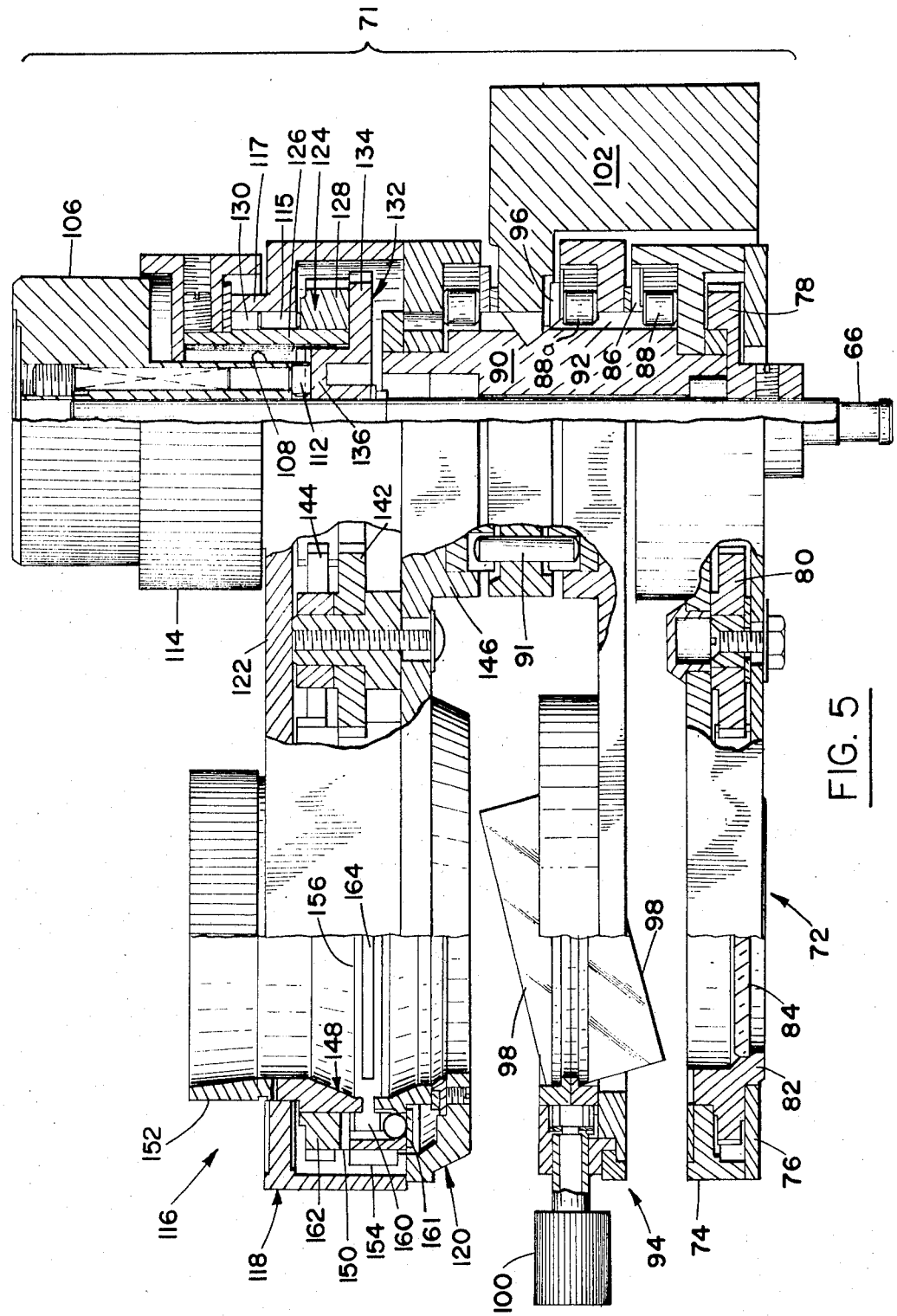
FIG. 5 is a side elevation view, partly in section, of a combination accessory to a refractor.

As best shown in FIG. 1, a cylinder lens assembly 10 includes a housing 12 carrying a viewing tube 18 and a cylinder lens disc assembly 20 rotatably mounted on the housing 12. The cylinder lens disc assembly 20 includes a cylinder lens disc 28 carrying a set of cylinder lenses 30 of various power. The cylinder lenses 30 are each mounted circumferentially on the cylinder lens disc 28 and in rotatable relation thereto within a cell 32 having a series of perimetrically formed gear teeth. Rotation of the cylinder lens disc 28 will place one of the cylinder lens into optical alignment with the viewing tube 18. The cylinder lens disc assembly 20 is attached at its center to a cylinder disc bearing shaft 34. A circular axis change gear 36 rotatably and centrally mounted on the front surface of the cylinder disc 28 acts as a sun gear for the cylinder lens cells 32. A power indicator gear 38 is fixed to the cylinder lens disc 28 in front of the axis change gear 36. A cylinder power control gear 42 integral with a control gear shaft which extends through an aperture in the housing 12 is terminated by a cylinder power control knob (not shown). The cylinder power control gear 42 meshes with the power indicator gear 38. Rotation of the cylinder power control knob will rotate the cylinder lens disc 28 thereby, presenting a lens 30 of different power to the viewing tube 18 as mentioned heretofore. An axis indicator gear is mounted in housing 12 in circumscribed relation to the viewing tube 18 and connected to a pointer ring indicating the astigmatic axis and meshed with the axis change gear 36 and thereby synchronized with the axis of the cylinder lenses 30.

A crank assembly 40, as best seen in FIGS. 1 and 3 couples the axis change gear 36 to the drive shaft 66 and includes a cylinder lens drive gear 46 butted against the crank assembly support 48. Assembly 40 is held in place by a central screw 50 screwed into a threaded receptacle or connector 64 in one of the cranks 54, while the crank assembly support 48 is held to the housing 12 by a pair of spaced screws.

Two crank mechanisms 52, each comprising a couple of spaced, circular cranks 54 connected by a link 56 are positioned in front of the crank assembly support 48. Each link 56 has a circular portion circumscribing each crank 54 in spaced relation thereto, thereby forming a channel 58 within which a series of balls 60 are located. The balls 60 are held in the channel 58 by ball retainer covers 62 that are placed on each side of the link 56. The crank mechanisms 52 are positioned such that one is spaced from and mounted in front of the other providing two pairs of cranks 54. One pair of cranks 54 is connected by the internally threaded connector 64 which is engaged by the screw 50, while the other pair of cranks 54 is connected by the drive shaft 66 and a collar 68 circumscribing the drive shaft 66 and butting against a ball retainer cover 62. The collar 68 is pinned to the rearmost crank of the crank pair engaged by the drive shaft 66. The drive shaft 66 and the connector 64 are both radially spaced from the axial centers of their respective cranks 54. A second connector or pin 70 connects a pair of cranks 54 and is in spaced relation to the axial center of the cranks. One of the respective second connectors 70 lies on a line forming an angle with the drive shaft and the axial center of each crank as does the other second connector with the connector 64 and the axial center of the respective cranks. The cylinder lens drive gear 46 includes a pin 67 extending therefrom and engaging a receptical in the rearmost crank 54.

The drive shaft 66 is connected to an accessory combination 71 including an accessory cylinder lens turret 72, a Risley Prism turret 94 and a cross cylinder lens turret 116, as been illustrated in FIG. 5. The accessory cylinder lens turret 72 comprises an accessory cylinder lens turret frame 74 having an accessory cylinder lens turret cover 76 superposed thereon. The accessory cylinder lens turret 72 encompasses a main accessory cylinder lens gear 78 fixed to the drive shaft 66 by a pair of screws passed through a gear collar to bear against the drive shaft 66. An idler gear 80 meshes with the main accessory cylinder lens cell 82 through the gear teeth formed on the circumference thereof. The accessory cylinder lens cell 82 mounts an accessory cylinder lens 84. The accessory cylinder lens turret frame 74 carries an accessory cylinder lens positioning means 86 having a central opening including a wall with an inwardly extending spring loaded roller 88 located in a slot in the wall. The accessory cylinder lens positioning means 86 has an inwardly extending, annular shoulder defining an aperture of smaller diameter than the central opening, coaxial therewith through which the drive shaft 66 extends. A lock shaft 90, circumscribing the drive shaft 66, has a terminal end of smaller diameter than the remaining portion thereof to engage within the aperture and provide the channel for passing the drive shaft therethrough. The difference of diameters between the lesser terminal end and the greater remaining portion defines a shoulder which bears against an annular shoulder of the accessory cylinder lens turret frame 74. The lock shaft 90 includes two V-shaped grooves 92 extending parallel to the axis of the lock shaft 90 in two predetermined positions to engage the spring loaded roller 88. One position places the accessory cylinder lens 84 in alignment with the viewing tube 18 and the other position places it out of alignment with the viewing tube 18.

The Risley prism turret 94 is positioned in front of the accessory cylinder lens turret 72 and has a spring loaded roller 88a positioned in the central opening of the Risley prism positioning means 96 which is similar in configuration to the accessory cylinder lens positioning means 86. The two prisms of a Risley prism 98 are each mounted in a lens cell having teeth cut in the periphery thereof such that rotation of an adjustment knob 100 having a terminal gear portion bearing against the teeth of the lens cells rotates the cells counter to each other.

A right angle mounting bracket 102 is assembled on the lock shaft 90 adjacent to the Risley prism turret 94. The mounting bracket 102 has a collar circumscribing the lock shaft 90 and has a pin 91 extending toward the back from the collar to engage a groove formed in the Risley prism turret 94 as a stop therefor. The mounting bracket 102 is fixed in position on the lock shaft 90 and attached to the housing 12.

As best shown in FIGS. 1, 4 and 5, an axis control knob 106 is attached to the drive shaft 66 remote from attachment of the drive shaft 66 with the crank assembly 40. The axis control knob 106 comprises a cylindrical base portion having a tubular post portion 108 with a pair of spaced, generally triangular extensions 110 protruding therefrom with a spring loaded roller 112 extending therebetween. The tubular post portion 108 extends through the axial hole formed in a flip knob 114. The bottom surface of the axis control knob 106 abuts a horizontal annular flange formed in the flip knob 114 including a first forward extending wall rising from the annular flange circumscribing in spaced relation the lower outer circumference of the cylindrical base portion of the axis control knob 106. A cross cylinder lens turret 116 comprises a cross cylinder lens turret frame 118 and a cross cylinder lens turret cover 120. The cross cylinder lens turret frame 118 has the general configuration of a tear drop with a small aperture 115 formed therethrough at the narrower end. A wall 117 extends forwardly, and in circumferential adjacent relationship to the small aperture 115 on one side of the base 122 of the turret frame 118. The flip knob 114 has a second wall circumscribing the forward extending wall 117 placing the axial hole of the flip knob 114 in substantial coaxial alignment with the small aperture 115. The post portion 108 extends through the small aperture 115 to lie in a well formed by the forwardly extending wall 117 and the thickness of the base 122. A main flip gear 124 includes a tubular central shaft 126 which extends away from and is attached to a circular gear portion 128, as well as fitting within the well to circumscribe the post portion 108. A ring like bearing support 130 fits around the tubular central shaft 126 and into the well to bear against the wall of the aperture in the base 122 and the forwardly extending wall 117. The flip knob 114 is fixed to the central shaft 126 by a set screw. As seen in FIGS. 4 and 5, a main cross cylinder axis gear 132 comprises a flat, circular gear portion 134 having perimetrical teeth and a tubular extension 136 extends from a side of the gear portion 134. The tubular extension 136 has a face including a raised section 138 protruding therefrom and three grooves 140 cut therein in spaced relation to each other on the side opposite from the raised section. The face of the tubular extension 136 is positioned within the central shaft 126 of the main flip gear 124 to bear against the roller 112 of the post portion 108 with the raised section 138 radially opposite in position to the extensions 110 and with the roller 112 within a groove 140. The base 146 of the cross cylinder lens turret cover 120 has a pair of spaced pins extending forwardly therefrom one of which supports an axis idler gear 142 which meshes with the circular gear portion 134 of the main cross cylinder axis gear 132 and the other of which supports a flip idler gear 144 which meshes with the teeth of the main flip gear 124. The main cross cylinder axis gear 132 and the main flip gear 124 are in abutted axial alignment while the flip idler gear 144 and the axis idler gear 142 lie on two spaced parallel planes. A cross cylinder cell 148 comprises a ring-like, radially outwardly extending flange portion 150. The flange portion 150 has a tubular shank 152 extending therefrom with the flange portion 150 coaxial with the tubular shank 152. A plastic spur gear ring 154 is abutted on the flange portion 150 having its teeth directed outwardly away from the axis of the tubular shank 152. A C-shaped cross cylinder yoke 156 retaining the cross cylinder lens 164 is fitted into a pair of slots formed on opposite sides of the flange portion 150. As seen in FIGS. 2 and 5, the cross cylinder yoke 156 includes at one of its terminal ends a gear 158 which is positioned to extend above the flange portion 150 and at the other terminal end a detent wheel 160 with two V-notches formed therein spaced 180° apart. The cross cylinder yoke 156 is free to flip within the cross cylinder cell 148. A small ball is lodged in the spur gear ring 154 bearing against the periphery of the detent wheel 160. The ball is urged toward the detent wheel 160 by a leaf spring 161. A circumferential collar portion integral with the tubular shank 152 is positioned adjacent the flange portion 150 to support an annular, plastic, combination spur and face gear 162, the face gear of which meshes with the gear 158 of the cross cylinder yoke 156 and the spur gear portion of which meshes with the flip idler gear 144.

Rotation of the axis control knob 106 rotates the tubular post portion 108 which in turn rotates the main cross cylinder axis gear 132 because of the engagement of the roller 112 in one of the grooves 140. As the main cross cylinder axis gear 132 rotates, it interacts with and rotates the axis idler gear 142 which in turn rotates the spur gear ring 154 resulting in rotation of the axis of the cross cylinder cell 148 including the cross cylinder yoke 156 and lens 164. Rotation of the spur gear ring 154 also causes the flip gear train to rotate thereby rotating the flip knob 114. Primary rotation of the flip knob 114, that is rotation of the flip knob 114 alone, rotates the main flip gear 124 rotating the flip idler gear 144 which in turn rotates the spur and face gear 162 resulting in rotation of the yoke gear 158 and in rotation of the detent wheel 160 moving the nonengaged V-notch of the detent wheel 160 180° into engagement with the ball and flipping the cross cylinder yoke 156 180°. Primary rotation of the flip knob 114 will not cause the axis control knob 106 or the axis gear train to rotate because a higher torque is required to rotate drive shaft 66 or disengage the roller 112.

Rotation of the axis control knob 106 not only rotates the main cross cylinder axis gear 132 thereby rotating the axis of the cross cylinder cell 148 but also rotates the drive shaft 66 which causes rotation of the accessory lens cell 82 and simultaneously activates the linkage mechanisms transmitting the motion to the cylinder lens drive gear 46 which in turn rotates the cells 32 of the cylinder lenses 30. In other words, a change in the axis of the cross cylinder lens brought about by manipulation of the axis control knob 106 will cause a synchronized change of axis of the cylinder lenses 30 and the accessory cylinder lens 84.

The Risley Prism turret 94 and the cross cylinder lens turret 116 can be positioned in and out of alignment with the viewing tube 18 in a manner similar to that of the accessory cylinder lens turret 72.

I claim:

1. In combination with vision analysis apparatus having a battery, including:
    a viewing tube;
    a cylinder lens assembly having cylinder lenses mounted thereon with each cylinder lens having a cylinder axis;
    means for positioning a selected cylinder lens in alignment with said viewing tube;
    means for setting the cylinder axis of the selected cylinder lens in the viewing tube; and
    a cross cylinder assembly mounted on the battery and having a cross cylinder lens, a yoke lying on a flip axis for holding the cross cylinder lens, a turret movably carrying the cross cylinder lens between a first position aligned with the selected cylinder lens and said viewing tube and another position unaligned with the selected cylinder lens and said viewing tube, and means for rotating the yoke in flipping movement about the flip axis;
    the improvement comprising, crank assembly means for synchronous alignment of the flip axis with the cylinder axis of the selected cylinder lens when the turret is in the first position, including at least two crank mechanisms, each crank mechanism lying on a plane parallel to the plane of the other crank mechanism, each crank mechanism having a first and second crank in spaced relation to each other, the first crank of one crank mechanism eccentrically connected by a connection means to the first crank of the other crank mechanism, the connection means lying on a plane at an angle to the planes on which the crank mechanisms lie.

2. The improvement according to claim 1 wherein a cylinder lens drive gear is attached to the crank assembly means and rotated thereby.

3. The improvement according to claim 2 wherein a drive shaft is connected to the crank assembly means whereby rotation of the drive shaft rotates the cylinder lens drive gear.

4. The improvement according to claim 3 wherein the means for setting the cylinder axis is an axis changer gear which meshes with the cylinder lens drive gear.

* * * * *